UNITED STATES PATENT OFFICE.

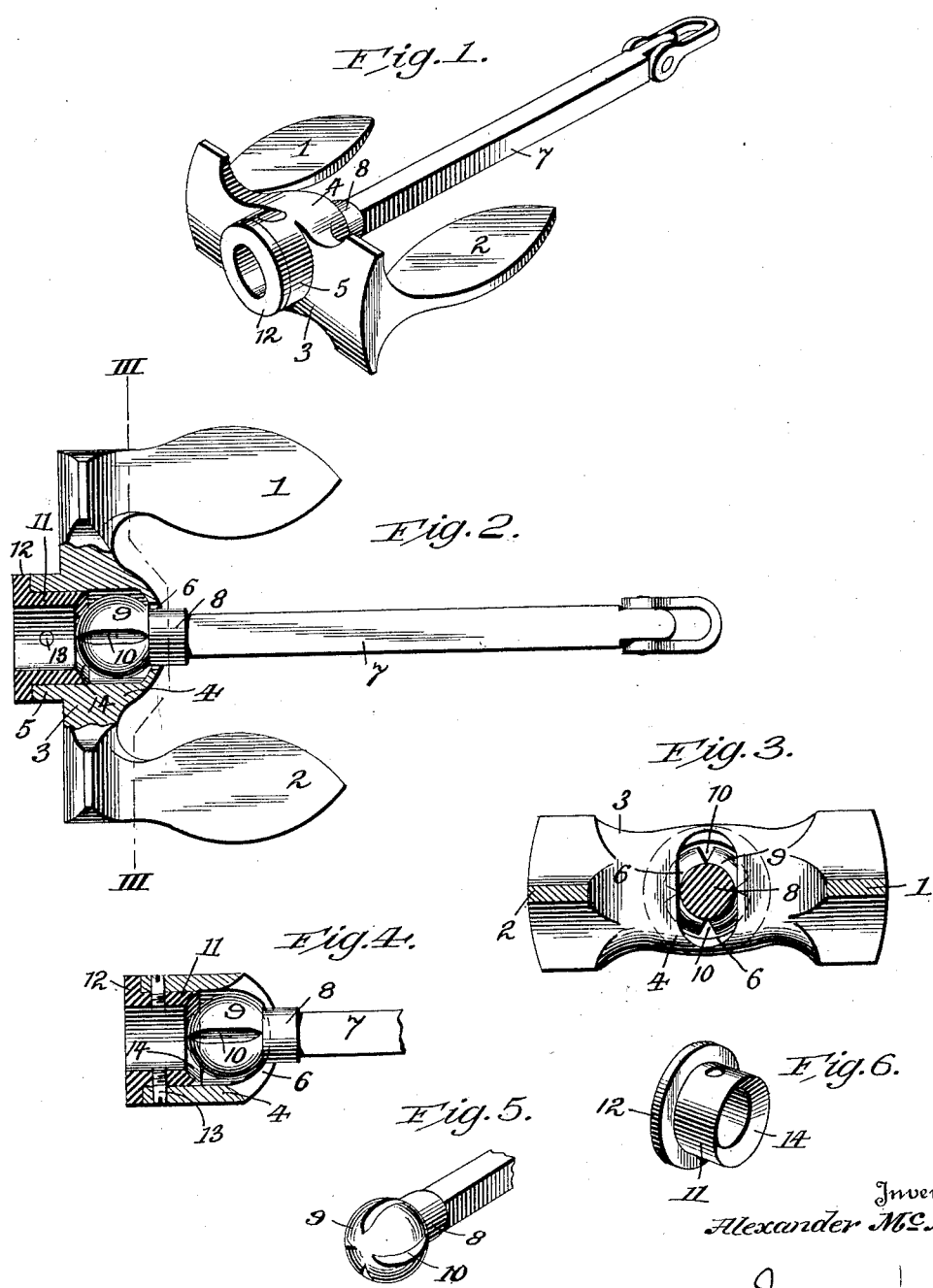

ALEXANDER McNAB, OF BRIDGEPORT, CONNECTICUT.

ANCHOR.

1,385,921.  Specification of Letters Patent.  Patented July 26, 1921.

Application filed September 11, 1920. Serial No. 409,552.

*To all whom it may concern:*

Be it known that I, ALEXANDER MCNAB, a subject of the King of Great Britain, residing at Bridgeport, in the county of Fairfield and State of Connecticut, have invented certain new and useful Improvements in Anchors, of which the following is a specification.

The present invention pertains to anchors and more particularly to those of the stockless type.

The main object of the invention is to construct the anchor of relatively few parts and to so connect the shank to the crown which carries the flukes that once the flukes take hold of the bottom they will not be wrenched or pulled out of position due to the twisting movement of the chain or cable which is produced by the ship riding and turning with the tide and current.

A further object of the invention is to so construct the anchor that it may be readily cleansed when being pulled inboard.

A still further object is to so construct the anchor that it may be readily disassembled in order that a spare may be stored aboard ship in a minimum of space.

With these and other objects in view, reference is had to the annexed drawings, wherein,—

Figure 1 is a perspective view of the anchor;

Fig. 2 a sectional plan view;

Fig. 3 a transverse section on the line III—III of Fig. 2;

Fig. 4 a detail sectional view taken at right angles to that of Fig. 2, or transversely of the crown;

Fig. 5 a perspective view of the ball head of the shank; and

Fig. 6 a perspective view of the stop collar or bushing employed to hold the head within the socket or recess formed within the anchor crown.

In the drawings, 1 and 2 denote the anchor flukes formed integral with the crown 3. Said crown at its center is enlarged, as at 4, and a socket or recess extends rearwardly therefrom and through a rearwardly extending flange 5. The crowned portion is formed with an elongated slot 6, the length of the slot being transverse to the crown or the longitudinal axis thereof. The shank is denoted by 7, and is provided with a cylindrical section 8 and immediately adjacent thereto with a spherical head 9, the latter being provided with channels or grooves 10 extending from the section 8 toward the bottom of the head. When the parts are in their assembled position the head 9 fits against the inner rounded face of the socket within the crown, the cylindrical section 8 at the same time passing through the slot 6. The diameter of the section 8 is slightly less than the width of the slot so that the shank has but a slight limited motion toward either fluke while it may rotate about its axis and likewise swing bodily transversely of the crown limited only by the length of the slot. To maintain the shank in place, I preferably employ a bushing or collar of the form best shown in Fig. 6. The body 11 is of such external diameter as to make a neat fit within the flange 5 and the adjacent wall of the socket in the crown, the outer end of the bushing being formed with a laterally extending collar 12 which takes against the outer end of flange 5. Screws 13 passed through the flange 5 and into the body 11 serve to hold the bushing or collar in place and to permit of its ready removal when for any reason it becomes desirable to disassemble the shank and crown. The inner end of the collar is preferably rounded out or beveled as at 14, forming a bearing for the head 9 and permitting the head to ride thereover as the shank swings and rotates, without undue wear or friction on the parts.

The construction is such that the anchor may be readily freed of mud and sediment, as it is pulled inboard, by the playing of a stream of water from a hose through the slot 6, the grooves 10, about the head 9 and out through the bushing 11.

What is claimed is:

1. In an anchor, the combination of a crown piece having a socket formed therein; a shank; and a substantially spherical head carried by the shank, seated and held in the socket, said head having grooves formed in the outer face thereof.

2. In an anchor, the combination of flukes and an integrally formed crown, said crown having a socket formed centrally thereof, said socket being open at the under face of the crown and closed at its opposite end except for an elongated slot extending transversely of the crown; a shank; a cylindrical portion formed on the shank; a spherical shaped head carried by the shank adjacent said cylindrical portion, said portion extending through the slot aforesaid while the head is seated in the upper portion of the socket, and said head having channels formed in its outer face; a flange extending from the lower face of the shank, the inner wall whereof forms a continuation of the socket; a bushing, the inner end whereof is inwardly inclined, said bushing being seated in the lower end of the socket and having a laterally extending collar which contacts with the outer end of the flange; and means for securing the bushing in place.

In testimony whereof I have signed my name to this specification.

ALEXANDER McNAB.